United States Patent Office 3,394,394
Patented July 23, 1968

3,394,394
PHOTOGRAPHIC MEDIUM BASED ON
5-HALOFURFURYLIDENES
John Alan Mattor, Hollis, and Lawrence Price, Old Orchard Beach, Maine, assignors, by mesne assignments, to Scott Paper Company, Delaware County, Pa., a corporation of Pennsylvania
No Drawing. Continuation-in-part of application Ser. No. 351,316, Mar. 12, 1964. This application Mar. 29, 1967, Ser. No. 626,721
6 Claims. (Cl. 96—90)

ABSTRACT OF THE DISCLOSURE

It has been found that the 5-halofurfurylidenes, especially the azines, when used with a primary aromatic amine enhancer and a lower halohydrocarbon sensitizer to produce a photographic medium increase the medium's sensitivity to light, in some cases by a factor of 10 or greater, as compared to those photographic mediums containing a furfurylidene that is not halogenated in the 5 position on the furan ring.

Related application

This application is a continuation-in-part of Ser. No. 351,316, "Photosensitive Mediums Comprising a Furfurylidene, a Primary Aromatic Amine and a Lower Haloalkane," filed Mar. 12, 1964, in the names of Mattor and Price and which is to be abandoned in favor of its continuation-in-part Ser. No. 641,720 filed Apr. 21, 1967.

Summary of the invention

As disclosed in the above identified case, excellent photographic mediums can be prepared by dispersing in a suitable light passing resinous binder as a color former a furfurylidene purified to remove dark reaction products that may have been formed in its preparation, a primary aromatic amine and a lower halohydrocarbon sensitizer such as iodoform. Such mediums are usually negative working, and can be exposed with ultraviolet or actinic light. They are developed relatively simply by heating in air to above 100° C. which heating also drives the halohydrocarbon sensitizer, and preferably the amine, from the background areas so that they are stable and no longer sensitive to light.

It has now been found that the 5-halofurfurylideneimines when used as the color former increases the sensitivity of the photographic plate to light three-fold or more. In some cases, the halohydrocarbon sensitizer need not be used. The iodo, chloro and bromo derivatives of the furfurylidene azines have been found to be particularly effective, especially when used with primary aromatic amine enhancers that contain at least one additional functional group on the benzene ring.

The photographic chemicals are applied from solvent solution in admixture with the resinous binder in an amount of about 2 to 7 pounds (dry basis) per ream (3300 square feet). The resin binder is normally used in an amount of 1 to 40 parts by weight based on the furfurylidene (including plasticizer if any). The amine is present in 0.1 to 4 parts by weight based on the furfurylidene and the halohydrocarbon sensitizer is present in an amount in the range of 0.1 to 20 parts by weight based on the furfurylidene solution of the photographic medium can be cast as a film on a suitable support, e.g., a cast coated paper or a plastic film, or can be used to impregnate a support such as a paper web substantially free of mineral fillers.

Preferred embodiments

The halofurfurals used in the preparation of the azines were made as follows:

5-chlorofurfural.—Chlorine gas was slowly introduced to a refluxing solution of furfural (48.0 g., 0.50 mole), benzoyl peroxide (0.48 g.) and sulfur (0.32 g.) in 400 ml. carbon disulfide until 71 g. had been added. During addition, HCl gas was slowly evolved. When addition was complete, the solution was refluxed for two hours. The solvent was removed and the black residue heated on the steam-bath for two and a half hours with $K_2CO_3$ added to remove excess acid. The residue was dissolved in chloroform, treated with charcoal, filtered and the solvent stripped from the pale yellow solution giving 31 g. of the pale yellow chlorofurfural. Yield=47.5%.

5-bromofurfural.—The furfural (57.6 g., 0.60 mole) was dissolved in 250 ml. dichloroethane and 0.01 g. each of hydroquinone and sulfur added. The solution was brought to reflux and the bromine (112 g., 0.70 mole) in 150 ml. dichloroethane was slowly added over two hours. Nitrogen was either passed through the system at the end of bromine addition or at the start of the reaction. The solution was refluxed for 3 hours then the solvent removed at reduced pressure. The deep red liquid was treated with 20 g. potassium carbonate to remove the excess acid, and allowed to stand for 30 min. Unless the acid was removed spectacular polymerization occurred in the subsequent steam distillation. Water was slowly added and the solution steam distilled. Extraction of the distillate with chloroform followed by drying purification with carbon and addition of petroleum ether (90–120° C.) yielded 46.8 g. 5-bromofurfural, white needles, M.P. 77.5–79.5° C.

5-iodofurfural.—The above bromofurfural (3.5 g., 0.020 mole) and potassium iodide (3.5 g., 0.021 mole) were mixed in 20 ml. glacial acetic acid and refluxed for one hour. The potassium iodide dissolved and potassium bromide precipitated. The reaction product was poured into water giving a light tan slurry, which was filtered, washed well with water, and recrystallized from ethanol/water using activated charcoal to yield 3.35 g. pale orange crystals, M.P. 121.5–124.0° C. Yield=76%.

The azines were prepared as follows:

Di - (5- bromofurfurylidene) azine.—The bromofurfural (2.0 g., 0.0113 mole) was dissolved in ethanol and to this was added 10 ml. (0.2 g., 0.006 mole) hydrazine solution in ethanol (1 g. hydrazine in 50 ml. ethanol), and the solution was refluxed for one hour. Water was added and the yellow solid filtered, air-dried, recrystallized from chloroform/petroleum ether (90–120° C.) using activated charcoal to yield 1.50 g. pale yellow plates, decompose 166° C. Yield=71.5%.

The 5-chloro and the 5-iodofurfurylidene azines were prepared in a similar manner.

Photographic plates were made up with the azines and tested. The base was a paper sheet having a cast coating of a pigmented potassium polyacrylate (Nopco Chemical's Modicol) that was substantially impervious to the coating solution. The coatings were applied in an amount of 2 to 4 pounds (dry basis) per ream (3300 square feet) with a Mayer bar and were allowed to air dry in the dark. Binder #1 was a polystyrene resin (Dow Company's PS-3), Binder #2 was also a polystyrene resin (Dow Company's Styron 666). Example VI shows that the sensitivity imparted by the 5-halofurfurylidene can be such that images can be obtained even without the halohydrocarbon sensitizer.

Example I.—0.03 g. di-(5-bromofurfurylidene) azine, 0.06 g. 2,4-toluenediamine, 0.1 g. iodoform, 4 ml. 10% Binder #1 in chloroform, coated and exposed through a negative by a 200 watt tungsten lamp for 30 seconds at a distance of 7.5 inches and cured at 300° F. for 90 seconds gave a strong blue image with good contrast and excellent background.

Example II.—0.03 g. di-(5-iodofurfurylidene) azine, 0.09 g. 4-ethoxy-phenylenediamine, 0.10 g. iodoform, 4 ml. 10% in chloroform coated and exposed as in Example I for 20 seconds and cured at 300° F. gave an intense deep green image with high contrast and excellent background.

Example III.—0.03 g. di-(5-iodofurfurylidene) azine, 0.06 g. 2,4-toluenediamine, 0.10 g. $CHI_3$, 4 ml. 7.5% Binder #2 in $CHCl_3$ coated and exposed as above for 10 seconds and cured at 300° F. for 90 seconds: gave a good blue image with excellent background.

Example IV.—0.02 g. di-(5-chlorofurfurylidene) azine, 0.05 g. 4-ethoxy-m-phenylenediamine, 0.10 g. $CHI_3$, 4 ml. 10% Binder #1 in chloroform, exposed for 5 seconds to carbon arc and cured at 250° F. gave an excellent blue image.

Example V.—0.02 g. di-(5-iodofurfurylidene) azine, 0.05 g. 2,4-toluenediamine, 0.10 g. $CHI_3$, 0.3 g. Binder #2 in 4 ml. chloroform, coated on PVA base paper, placed in an Argus C-3 camera, exposed in bright sunlight (9 a.m.) for 30 seconds, f3.5 and cured, gave a strong blue negative.

Example VI.—0.15 g. di-(5-iodofurfurylidene) azine, 0.10 g. 2,4-toluenediamine, 4 ml. 10% Binder #1 coated and exposed to UV arc for 20 seconds and heat cured, gave a blue-green image.

Example VII.—0.02 g. di - (5 - bromofurfurylidene) azine, 0.05 g. 4-ethoxy-m-phenylenediamine, 0.005 g. iodoform, 4 ml. 10% Binder #1, exposed to UV arc for 5 seconds and cured at 300° F., gave a good blue image.

Methylenedianiline, 4-iodo-m-phenylenediamine, oxydianiline, and 4-chloro-m-phenylenediamine have also been used as enhancers. The enhancer used is preferably different from any amine that may have been used in the preparation of the furfurylidene.

The chloro and bromo species of di-(5-halofurfurylidene)-p-phenylenediamine; the chloro, iodo and bromo species of 5-halofurfuryl thiosemicarbazone and 4,5-dibromofurfurylidene azine have also been used with good results.

We claim:

1. A photographic medium comprising a light passing binder containing dispersed therein in image producing amounts and proportions:
    (a) as a color former, a purified furfurylideneimine, the furan ring of which is substituted in the 5 position with a halogen atom and
    (b) as an enhancer, a primary aromatic amine.

2. The photographic medium of claim 1 wherein said color former is a furfurylidene azine containing two furan rings both of which are substituted in the 5 position with a halogen atom selected from the group consisting of chlorine, bromine and iodine, wherein said primary aromatic amine contains one additional functional group on the benzene ring and wherein a lower halohydrocarbon is present in a light sensitizing amount.

3. The photographic medium of claim 2 wherein said halohydrocarbon is iodoform.

4. The photographic medium of claim 1 wherein said primary aromatic amine is different from any that may have been used to prepare said furfurylidene.

5. A photographic plate comprising a support and thin film thereon of the photographic medium of claim 1.

6. The photographic medium of claim 1 wherein said halogen atom is selected from the group consisting of chlorine, bromine and iodine, and iodoform is also included in said binder in a light sensitizing amount.

References Cited

UNITED STATES PATENTS 3,147,117 9/1964 Wainer et al. _____ 96—90
3,202,507 8/1965 Sprague et al. _____ 96—90

NORMAN G. TORCHIN, *Primary Examiner.*

C. E. DAVIS, *Assistant Examiner.*